United States Patent Office.

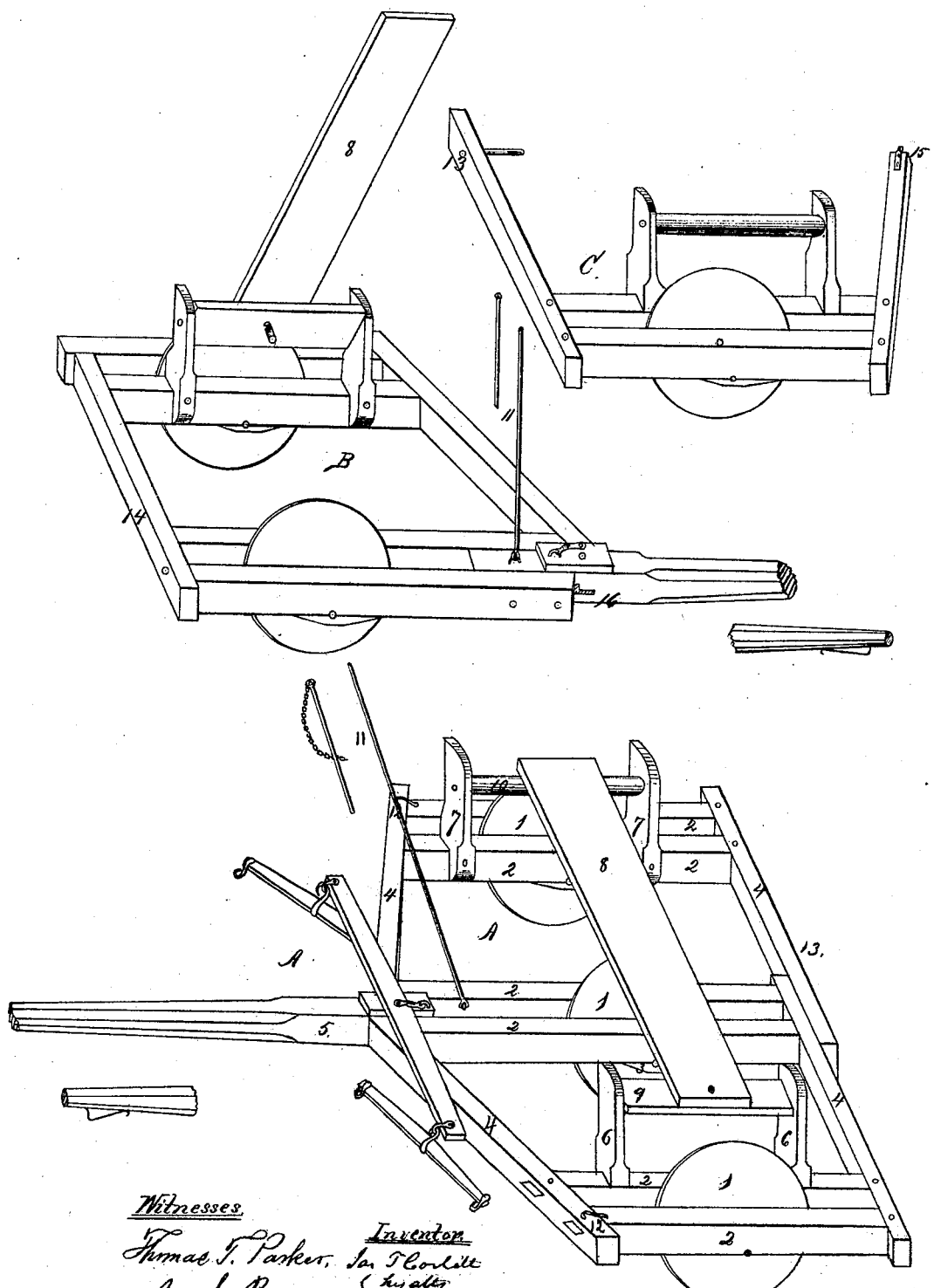

JAMES T. CORBITT, OF DES MOINES, IOWA.

Letters Patent No. 98,350, dated December 28, 1869.

IMPROVEMENT IN CORN-MARKERS.

The Schedule referred to in these Letters Patent and making part of the same

*To all whom it may concern:*

Be it known that I, JAMES T. CORBITT, of Des Moines, in the county of Peck, and State of Iowa, have invented a new and useful Improvement in Corn-Markers; and do hereby declare the following to be a full, clear, and exact description of the same.

Figure A represents the machine entire.

Figures B and C represent the machine separated into sections, for convenience of transportation.

The Nos. 1 in Fig. A, represent three wheels, made of wood, which should be from twenty to twenty-four inches in diameter, which mark the corn-rows when the machine is in motion.

The Nos. 2 represent the pieces of frame which sustain the wheels, placed between them on small axles, the ends of which are seen at 3 3 3.

The Nos. 4 represent the end pieces of the frame.

The Nos. 5 represent the pole or tongue.

The Nos. 6 and 7 represent the supporters of the seat, which is No. 8.

The Nos. 9 and 10 represent pieces, on which the seat rests. Both of these pieces turn on spindles, resting in the upright parts of Nos. 6 and 7.

The No. 11 represents a pole or rod, with a chain hung to the outer end of it, the other end being fastened to the hinder end of the pole or tongue of the machine with a staple, so as to permit it to revolve the length of this pole, to be regulated by the width of the machine; for example, if the wheels are three and one-half feet apart, this pole should be ten and one-half feet, so that the chain at the end of it, dragging on the ground, will make a slight mark, to guide the driver in laying off his next rows.

The No. 12 represents a bolt or pin, passing through he tenon, the end of which should stand up above the frame sufficiently to keep the rod or pole No. 11, sufficiently forward.

The No. 13 represents an iron bolt, which couples the sections of the machine together at No. 14.

The No. 15 represents a clevis or hinge, working on No. 16, and these, with Nos. 13 and 14, constitute the coupling-apparatus.

The frame and wheels of the machine are to be made of hard wood.

I claim, the frames 2 2 and 4 4, when hinged as described, and provided with marking-wheels 1 1 1, in combination with the seat 8 and supporting-roller 10, all arranged and operating as specified.

JAS. T. CORBITT.

Witnesses:
WM. P. BENTLEY,
M. D. McHENRY.